United States Patent [19]

Robak, Jr. et al.

[11] Patent Number: 4,784,603
[45] Date of Patent: Nov. 15, 1988

[54] PROCESS FOR REMOVING VOLATILES FROM METAL

[75] Inventors: Casimir B. Robak, Jr.; Donald C. Evans, both of Newburgh; Everett M. Ramsey, Richland, all of Ind.

[73] Assignee: Aluminum Company of America, Pittsburgh, Pa.

[21] Appl. No.: 109,551

[22] Filed: Oct. 16, 1987

Related U.S. Application Data

[62] Division of Ser. No. 926,540, Nov. 4, 1986, abandoned.

[51] Int. Cl.⁴ .......................... F27B 14/00; F27D 5/00
[52] U.S. Cl. .......................................... 432/5; 432/11; 432/13; 432/72; 266/44; 110/222; 110/236; 110/282; 110/228
[58] Field of Search ............... 110/224, 228, 278, 281, 110/283, 203-205, 210, 211, 222; 432/8, 72, 59, 5, 13; 34/35, 86, 72; 266/156, 901, 44; 75/445

[56] References Cited

U.S. PATENT DOCUMENTS

| | | | |
|---|---|---|---|
| 2,932,264 | 4/1960 | Hurst | 110/282 |
| 3,627,289 | 12/1971 | Erman | 110/236 |
| 3,917,444 | 11/1975 | Carthew | 432/72 |
| 4,010,935 | 3/1977 | Stephens | 266/44 |
| 4,098,200 | 7/1978 | Dauvergne | 110/228 |
| 4,121,524 | 10/1978 | Voelskow et al. | 110/222 |
| 4,167,909 | 9/1979 | Dauvergne | 110/228 |
| 4,331,086 | 5/1982 | Fitch et al. | 432/72 |
| 4,389,978 | 6/1983 | Northcote | 110/281 |
| 4,418,816 | 12/1983 | Kropp | 110/268 |
| 4,510,873 | 4/1985 | Shigaki | 110/289 |
| 4,548,651 | 10/1985 | Ramsey | 134/11 |
| 4,563,959 | 1/1986 | Fujiwara | 110/281 |

FOREIGN PATENT DOCUMENTS 2046888 11/1980 United Kingdom .

Primary Examiner—Henry C. Yuen
Attorney, Agent, or Firm—Thomas J. Connelly; David W. Brownlee

[57] ABSTRACT

A process and apparatus is disclosed for removing volatile contaminants from scrap metal. The process is carried out in a furnace maintained at a relatively constant temperature having a first zone in which volatiles contained on the surface of the metal are vaporized and a second zone in which carbon contained on the surface of the metal is pyrolyzed. The furnace also has a vibrating conveyor for transporting metal therethrough at a specific speed. The process includes the step of vaporizing and fluidizing the volatiles to produce fumes containing unburned hydrocarbons without oxidizing the metal. The hydrocarbon fumes are then burned to produce hot gas which is recirculated to the furnace so as to contact new incoming scrap metal.

14 Claims, 2 Drawing Sheets

PROCESS FOR REMOVING VOLATILES FROM METAL

This application is a division of application Ser. No. 926,540, filed Nov. 4, 1986, now abandoned.

FIELD OF THE INVENTION

This invention relates to a process and apparatus for removing volatiles from metal and more particularly to a process and apparatus using a vibrating fluid bed for delacquering scrap aluminum cans.

BACKGROUND OF THE INVENTION

In order to enhance the recovery of scrap metal contaminated with combustible hydrocarbons, it is desirable to remove the contaminants prior to melting the scrap metal. It has been recognized that organic contaminants such as paint and lacquer, which are presently coated on aluminum beverage cans, have heat content which can be recovered to heat incoming material. The use of the heat content of hydrocarbon contaminants has been used in drying and oxidizing operations. Three patents which teach the usefulness of preheating with burned hydrocarbons are U.S. Pat. Nos. 2,795,054; 3,005,699; and 3,623,235. In addition, a method of using vaporized fumes to preheat material in a rotary kiln is taught in U.S. Pat. Nos. 4,548,651 and 4,601,750.

U.S. Ser. No. 879,066, entitled "Process and Apparatus for Removing Volatiles from Metal" which was filed June 26, 1986, and assigned to Aluminum Company of America, teaches a process and an apparatus for removing volatiles from metal, especially aluminum, without the step of vibrating the material as it is transported through a furnace. Such a process and apparatus is highly efficient, relatively pollution free, easily operated and capable of handling large quantities of scrap metal. However, it has been found that a more efficient operation can be obtained by vibrating and fluidizing the material being transported on the conveyor through a furnace.

Now a process and an apparatus have been invented which includes the step of vibrating and fluidizing the metal to maximize the contact between the surface of the metal and the recirculating gas within the furnace to vaporize substantially all the volatiles contained thereon.

SUMMARY OF THE INVENTION

Briefly the present invention relates to a process for removing volatile contaminants from the surface of scrap metal, such as aluminum, and using the heat content of the vapor in the reclamation process. The process includes heating the scrap metal to a temperature sufficient to vaporize the volatiles without oxidizing the metal. By vaporizing the volatiles, fumes are produced which contain unburned hydrocarbons. The unburned hydrocarbons are then directed to a burner and are incinerated to produce a hot gas. This hot gas is recirculated to the furnace to heat the incoming scrap metal. While the hot gas is brought into contact with the metal, the metal is vibrated so as to maximize contact therebetween. Vibration of the metal within the furnace permits efficient vaporization of substantially all the volatiles contained on the metal.

The reclaiming apparatus which is capable of removing volatiles from the surface of the metal includes a furnace which is maintained at a relatively constant temperature. The furnace includes a first zone in which the volatiles are vaporized and a second zone in which any remaining carbon contained on the surface of the metal is pyrolyzed. The apparatus also includes means for transporting and vibrating the metal through the furnace at a specific speed and at a set vibration stroke to ensure complete vaporization of the volatiles and pyrolysis of the carbon to occur.

A general object of this invention is to provide a process and apparatus which includes vibration of scrap metal being transported through a furnace so as to remove the volatile contaminants contained thereon and fluidizing to improve gas contact with the metal. A more specific object of this invention is to provide a process and apparatus for delacquering scrap aluminum beverage cans.

Another object of this invention is to provide an efficient and cost effective process which uses vibration and hot recirculating gas to remove organic contaminants from the surface of scrap aluminum beverage cans.

Still another object of this invention is to provide a process for removing volatile contaminants from scrap aluminum cans which has marked improvements in fuel savings, handling capacity and pollution control.

A still further object of this invention is to provide an apparatus which can handle large quantities of scrap aluminum cans and uses the heat of incineration of the unburned hydrocarbon contaminants to supply hot gas to heat a vibrating bed of incoming scrap aluminum pieces.

Other objects and advantages of the present invention will become more apparent to those skilled in the art in view of the following description and the accompanying drawings.

DETAILED DESCRIPTION OF THE PREFERRED EMBODIMENTS

Figure 1:
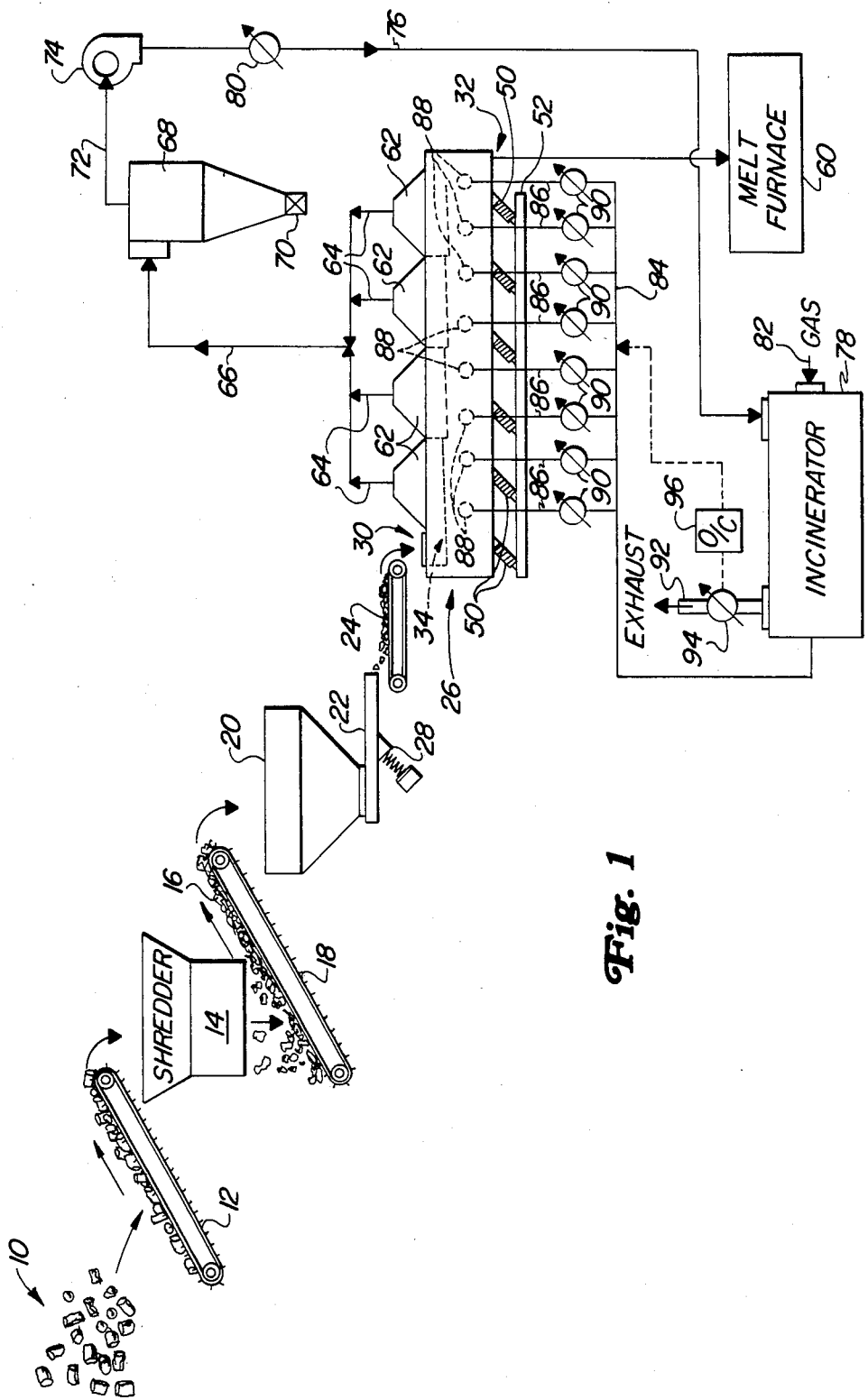
FIG. 1 is a schematic flow diagram illustrating a continuous process for removing volatiles from scrap aluminum beverage cans using a furnace having a vibrating bed.

Referring to FIG. 1, scrap metal 10, such as scrap aluminum beverage cans, which has volatilizable and pyrolyzable contaminants coated on its surface, for example light oil, water base paint, lacquer or other organic volatiles, is shown. The contaminants must be removed before the metal can be reclaimed. For aluminum beverage cans in particular, the inside and outside surfaces are coated with a lacquer so as to protect the product which is contained in the can and also to permit the can to have printing placed upon it. These coatings are volatiles and will vaporize between 750° and 1200° F. and are capable of being burned above 1200° F. Any carbon residue remaining on the aluminum cans after the volatiles are vaporized can be pyrolyzed, that is they can be chemically changed by the action of heat, to carbon monoxide or carbon dioxide.

The scrap metal 10 is conveyed by a first conveyor 12, or otherwise fed, into a shredder 14. The shredder 14 shreds or crushes the scrap metal 10 into reduced metal pieces 16. The scrap metal 10 will be reduced to a size of less than 8 inches in length, preferably less than 6 inches in length, and more preferably between ½ and 3 inches in length. The metal pieces 16 should have a bulk density of between 5 and 15 pounds per cubic foot, preferably between 7 and 12 pounds per cubic foot, and more preferably between 7 and 9 pounds per cubic foot. When scrap aluminum beverage cans are being recycled, it is beneficial to reduce the metal to small sizes, less than 6 inches in length, in order to facilitate removal of the coating from their inside and outside surfaces. It should be noted that although the shredder 14 is depicted, other types of equipment which will reduce the size of the metal can be used, for example a crusher, a hammer mill, etc. The reduced metal pieces 16 are conveyed by a second conveyor 18 to a hopper 20. The hopper 20 is capable of holding a large quantity of the metal pieces 16 until needed. The material from the hopper 20 is routed by a feeder belt 22 to a weight belt 24 which deposits the metal 16 into a furnace 26. The feeder belt 22 is shown having a vibration mechanism 28 connected thereto so as to juggle and tumble the metal pieces 16 for even distribution onto the weight belt 24.

Figure 2:
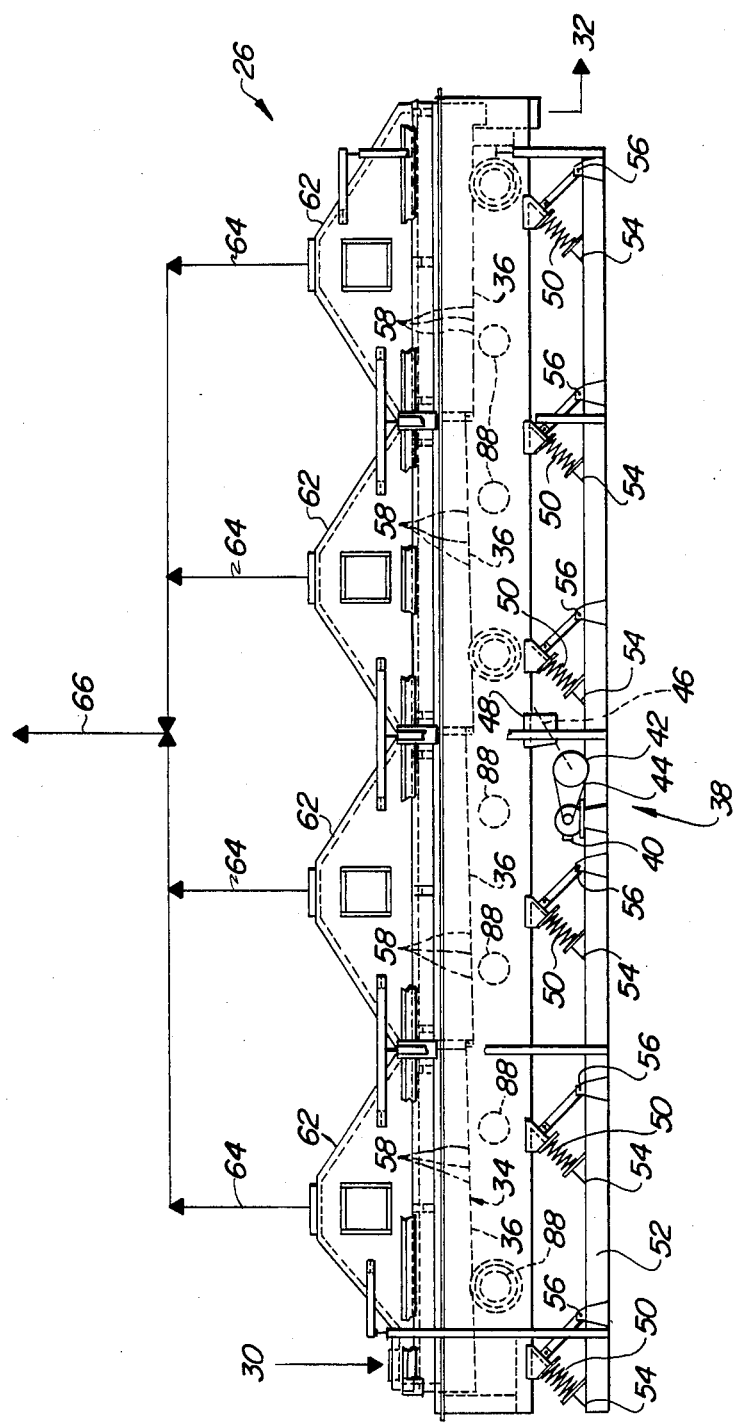
FIG. 2 is a schematic drawing of a furnace using a vibrating bed which advances and tumbles the material from the inlet to the outlet.

Referring to FIGS. 1 and 2, the furnace 26 contains an inlet 30 and an outlet 32 and has a continuous conveyor system 34 positioned therein for moving the metal pieces 16 therethrough. The furnace 26 will have a first zone in which the volatiles contained on the surface of the metal pieces 16 are vaporized and a second zone in which the carbon contained on the surface of the metal pieces 16 is pyrolyzed. The continuous conveyor system 34, best shown in FIG. 2, contains of one or more perforated pans 36 which are constructed of stainless steel so as to hold up under the high temperature environment experienced within the furnace 26. The perforated pans 36 contain a plurality of small apertures 58 formed therein which permit recirculating gas to pass upward and contact the metal pieces 16 being transported thereon. Preferably, the entire bottom surface of each pan 36 has a grid-like array of apertures 58 formed therein. The perforated pans 36 are mounted end to end so as to form a continuous conveyor from the inlet 30 to the outlet 32. Although the perforated pans 36 can be arranged in a horizontal or level fashion, a slight inclination is better for it enhances the lengthwise movement of the metal pieces 16. This inclined angle can be anywhere between 0° and 90°, preferably between 1° and 45°, and more preferably between 2° and 10°. The actual angle of inclination will be dependent upon the length of the furnace 26, the number of perforated pans 36 and the required retention time within the furnace 26.

By vibrating the metal pieces 16, one can maximize its contact with the recirculating gas and vaporize substantially all volatiles contained thereon. A vibrating mechanism 38 which supports the perforated pans 36 consists of an electrical motor 40 connected to a drive mechanism 42 by a belt or chain 44. The motor 40, which can be a 1,200 rpm motor, is geared down through the drive mechanism 42 to provide a speed of between 200 and 1,000 rpm, and preferably about 400 rpm, to the perforated pans 36. For the operation of delacquering scrap aluminum beverage cans, a vibration speed of between 200 and 800 rpm is acceptable. A connecting rod 46 attaches the drive mechanism 42 to a support structure 48 which in turn is fastened to each of the perforated pans 36. The support structure 48 is secured to a plurality of springs 50 which can be either coil or flex springs. The springs 50 are securely mounted to a support 52, such as a steel I-beam, via connections 54 and 56. The springs 50 are inclined at an angle of approximately 45° relative to the horizontal plane and are angled in the direction in which the structure 48 and perforated pans 36 will vibrate.

The perforated pans 36 will oscillate or vibrate in a direction toward the outlet 32 with a stroke of at least ¼ of an inch, and more preferably at a stroke of approximately ½ of an inch. The stroke can be adjusted by the location and connection of the connecting rod 46 between the drive mechanism 42 and the support structure 48. Vibrating equipment such as that described above is commercially available from Carrier Vibrating Equipment, Inc., Louisville, Ky. 40233. The specific speed and stroke and the type of vibrating mechanism used can vary depending on the size and type of furnace one is utilizing.

The speeds and strokes of the conveyor system 34, as well as the overall horizontal length of the furnace 26, will dictate the retention time need for the metal pieces 16. Control of the retention time is dependent upon the temperature and oxygen content at which the furnace 26 is operated. Adequate retention time is necessary to ensure that substantially all of the volatiles are vaporized and that any carbon present on the metal pieces 16 is pyrolyzed before the scrap metal exits the furnace 26. Upon leaving the outlet 32, the metal pieces 16 are routed to a melt furnace 60 where they are combined with virgin metal to form new ingot. If the metal pieces 16 are of a particular alloy which does not have to be blended, they could be melted down to form blocks or ingots of that particular alloy.

Referring again to FIG. 1, when scrap aluminum beverage cans are being delacquered, the furnace 26 is operated at a temperature of between 800° and 1200° F., preferably between 900° and 1050° F., and more preferably between 950° and 1000° F. This temperature is sufficient to vaporize the volatile contaminants contained on the metal pieces 16 as they are conveyed through the first zone of the furnace 26. This temperature is also sufficient to pyrolyze in the second zone of the furnace any carbon residue which may remain on the metal pieces 16 after the volatiles have been vaporized. Along with controlling the temperature of the furnace 26, the oxygen content is maintained between 8% and 12%, and more preferably about 10%. Fresh air containing oxygen is introduced into the furnace 26 through the inlet and outlet openings 30 and 32, respectively. The furnace 26 is also preferably operated at a negative pressure so as to prevent fumes from leaking out through the various openings during operation.

The hot exhaust from the furnace 26, which will contain partially unburned hydrocarbons, is directed upward and collects within a plurality of hoods 62. The hoods 62 are connected by a plurality of secondary exhaust pipes 64 which converge to form a single exhaust line 66. The exhaust line 66 routes the hot exhaust gas to a cyclone 68 which acts to filter out dirt and debris from the hot gas stream. The dirt and other solid particles filtered out of the hot exhaust gas accumulates in the bottom of the cyclone and is periodically removed via a dump valve 70. The exhaust gas, which still contains unburned hydrocarbons, rises to the top of the cyclone and is routed by a line 72 to a recirculating fan 74. The fan 74 directs the hot gas through a line 76 to an incinerator 78 where the hydrocarbons are burned. A damper 80 is positioned across the line 76 and can be automatically or manually adjusted to control the recirculating gas rate and also the velocity of the recirculating gas as it impinges upon the perforated pan 36.

The incinerator 78 is supplied with combustion gas through a supply line 82 and is operated at a temperature of between 1000° and 1500° F. Preferably the temperature of the incinerator 78 will be between 1200° and 1500° F. when used for the delacquering of aluminum scrap. The incinerator 78 is capable of burning the partially unburned hydrocarbons contained in the exhaust gas so as to provide a clean air stream void of unburned hydrocarbons which can be recirculated back to the furnace 26. The clean gas from the incinerator 78 is routed through a main line 84, through branch lines 86, and through smaller diameter supply lines 88 which contain a plurality of apertures (not shown) formed therein. The fluid network formed by the lines 84, 86 and 88 provide an even distribution of hot circulating gas to the furnace 26. A control valve 90, such as a damper, can be positioned across each of the branch lines 86 to control the recirculating rate and velocity of the recirculating gas therethrough.

A portion of the gas within the incinerator 78 is expelled to the atmosphere through an exhaust stack 92 which is preferably located near the outlet of the incinerator 78. The outlet is denoted as the portion of the incinerator 78 where the clean gas stream exits via the main line 84 and is opposite to the inlet line 76. It has been found that the gas exiting the incinerator 78 is so low in fume content that no further processing is necessary. The ability to exhaust clean air to the atmosphere without further incineration or clean-up, such as by scrubbing, can significantly reduce fuel costs and increase the efficiency of the system. The exhaust stack 92 is provided with a control damper 94 to control the rate at which the exhaust gas is exhausted from the incinerator 78. By controlling the rate at which the exhaust gas leaves the incinerator 78, one can control and maintain the pressure within the furnace 26 and thereby prevent fumes from leaking out through the various openings during operation. In addition, by regulating the rate at which the gas is exhausted from the incinerator 78 one can control oxygen content within the furnace 26. The oxygen content can be measured by an oxygen sensing device 96 positioned across the main line 84 and the exhaust stack 92. The oxygen sensing device 96 is capable of providing input to the exhaust control damper 94. Thus if an increase in the oxygen content is sensed within the exhaust stack 92, the control damper 94 will automatically throttle back, thereby decreasing the rate at which the fresh outside or ambient air is drawn into the furnace 26. Similarly, if a decrease in the oxygen content is sensed, the exhaust control damper 94 will be opened to increase the flow of outside air into the furnace 26. It has been found that under normal operating conditions about 20% of the gas is exhausted to the atmosphere.

The process for delacquering scrap aluminum beverage cans includes the steps of reducing the aluminum cans to small pieces less than 6 inches in length. These metal pieces are then conveyed into the furnace 26 where they are heated to a temperature of between 900° and 1100° F. in order to vaporize the volatiles contained thereon without oxidizing the aluminum. Any oxidation of the aluminum will reduce the amount of recoverable product. The vaporizing produces fumes containing unburned hydrocarbons which are routed to the incinerator 78 for burning. The burning process produces a hot gas having a temperature of between 1200° and 1500° F. and this hot gas is routed to the furnace 26 as a recirculating clean gas stream. If need be, the gas within the main line 84 can be mixed with a cooler gas to obtain a lower temperature of say between 900° and 1050° F. The recirculating gas is conveyed to the furnace 26 at a sufficient velocity to heat and fluff the incoming aluminum pieces. The gas fluffs the metal pieces 16 allowing them to move away from one another and expand the size of the fluidized bed thereby enhancing vaporization. As the recirculating gas passes through the apertures 58 formed in the perforated pans 36, it will have a velocity of between 10,000 and 60,000 feet per minute and preferably between 20,000 and 30,000 feet per minute. The velocity, however, will be dependent upon the size and number of openings formed in the perforated pans 36. The velocity of the hot recirculating gas will cause the aluminum pieces to fluff or expand outward away from one another as they are being vibrated and tumbled on the conveyor system 34. This combination of fluffing gives an expansion to the fluidized bed and the lengthwise travel and vibration of the metal pieces ensures that the hot recirculating gas will contact all surfaces and cause the volatiles contained thereon to be vaporized.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A process for removing volatiles contained on the surface of metal comprising the steps of:
    (a) reducing said metal to a predetermined size less than approximately 12 inches in length;
    (b) transporting said metal through a furnace at a predetermined rate of speed on a continuous conveyor having a perforated surface:
    (c) heating said metal to a temperature of between 750° and 1100° F. to vaporize said volatiles without oxidizing said metal, said vaporizing producing fumes containing unburned hydrocarbons;
    (d) burning said fumes containing said unburned hydrocarbons to produce hot gas;
    (e) recirculating said hot gas to said furnace and through said perforated surface of said conveyor at a sufficient velocity to heat and fluff incoming metal; and
    (f) vibrating said metal to maximize contact between the surfaces of said metal and said recirculating gas to vaporize substantially all volatiles contained thereon.

2. The process of claim 10 wherein said conveyor is vibrated at a stroke of at least ¼ of an inch and at a speed of at least 200 revolutions per minute.

3. The process of claim 2 wherein said conveyor is vibrated at a stroke of approximately ½ of an inch and a speed of approximately 400 revolutions per minute.

4. The process of claim 1 wherein the velocity of said recirculating gas through said perforated surface of said conveyor is between 10,000 and 60,000 feet per minute.

5. The process of claim 4 wherein the velocity of said recirculating gas through said perforated surface of said conveyor is between 20,000 and 30,000 feet per minute.

6. A process for delacquering scrap aluminum beverage cans comprising the steps of:

(a) reducing said aluminum cans to small pieces less than 6 inches in length;
(b) conveying said small pieces of aluminum into a furnace and heating to a temperature of between 900° and 1100° F. to vaporize volatiles contained thereon without oxidizing said aluminum, said vaporizing producing fumes containing unburned hydrocarbons;
(c) burning said fumes containing said unburned hydrocarbons to produce hot gas having a temperature of between 1200° and 1500° F. and mixing said hot gas with a cooler gas to obtain a mixed gas stream having a temperature of between 900° and 1050° F.;
(d) recirculating said mixed gas stream to said furnace and through said perforated surface of said conveyor at a sufficient velocity to heat and fluff incoming aluminum; and
(e) vibrating said aluminum to maximize contact between the surfaces of said aluminum and said recirculating mixed gas stream to vaporize substantially all volatiles contained thereon.

7. The process of claim 6 wherein the velocity of said recirculating mixed gas stream through said perforated surface of said conveyor is between 10,000 and 60,000 feet per minute.

8. The process of claim 7 wherein the velocity of said recirculating mixed gas stream through said perforated surface of said conveyor is between 20,000 and 30,000 feet per minute.

9. The process of claim 6 wherein said conveyor is vibrated at a stroke of at least ¼ of an inch and at a speed of at least 200 revolutions per minute.

10. A process for removing organic volatiles from the surface of aluminum comprising the steps of:
(a) reducing said aluminum to small pieces less than eight inches in length;
(b) conveying said small pieces of aluminum to a furnace and hating to vaporize said volatiles, said vaporizing producing fumes containing unburned hydrocarbons;
(c) burning said fumes containing said unburned hydrocarbons in an incinerator at a temperature of between 1000° and 1500° F. to product a hot gas;
(d) mixing said hot gas with a cooler gas to form a recirculating gas having a temperature of between 900° and 1050° F.;
(e) recirculating said gas through said small pieces of aluminum to heat and fluff the pieces;
(f) routing a portion of said recirculating gas to an upstream portion of said furnace and introducing sufficient oxygen to heat incoming aluminum pieces and vaporize volatiles contained on the surface thereof and routing the remaining portion of said recirculating gas to a downstream portion of said furnace where said gas contacts said aluminum leaving said upstream portion and pyrolyzes said aluminum to remove any carbon present on the surface thereof; and
(g) vibrating said aluminum while within said furnace to maximize contact between the surface of said aluminum and said recirculating gas to vaporize substantially all volatiles contained thereon.

11. A process for removing volatilizable contaminants from the surface of metal, comprising the steps of:
(a) shredding said metal into small pieces;
(b) routing said small pieces into a furnace and removing metal free of volatile surface contaminants from said furnace after a predetermined period of time;
(c) controlling the temperature and oxygen content within said furnace to facilitate vaporization of said volatiles without oxidizing said metal, said vapors containing unburned hydrocarbons;
(d) burning said vapors containing unburned hydrocarbons to produce a hot gas;
(e) recirculating said hot gas throughout said furnace and into contact with said metal, said gas having a velocity of at least 10,000 feet per minute, said recirculated gas fluidizing said metal and causing outward expansion thereof; and
(f) vibrating said metal to maximize contact between the surface of said metal and said recirculating gas to facilitate vaporization of substantially all volatiles contained thereon.

12. The process of claim 11 wherein said recirculating gas having a temperature of between about 1200° and 1500° F. is mixed with a cooler gas to lower the temperature to between about 900° and 1050° F. before contacting said metal.

13. A process for removing volatilizable contaminants from the surface of metal, comprising the steps of:
(a) shredding said metal into small pieces;
(b) conveying said small pieces of metal into a furnace and removing metal free of volatile surface contaminants from said furnace after a predetermined period of time;
(c) controlling the temperature of said furnace between about 800° and 1200° F. and controlling the oxygen content of said furnace between about 8 and 12% to facilitate vaporization of said volatiles without oxidizing said metal, said vapors containing unburned hydrocarbons;
(d) burning said vapors containing unburned hydrocarbons to produce a hot gas;
(e) recirculating said hot gas throughout said furnace and into contact with said metal, said gas having a velocity of between about 10,000 and 60,000 feet per minutes, said recirculated gas fluidizing said metal and causing outward expansion thereof; and
(f) vibrating said small pieces of metal to maximize contact between the surface of said metal and said recirculating gas to facilitate vaporization of substantially all volatiles contained thereon.

14. The process of claim 13 wherein the temperature of said hot gas leaving said burner is maintained between about 1000° and 1500° F.

* * * * *